Patented Apr. 1, 1924.

1,488,964

UNITED STATES PATENT OFFICE.

ADOLF WELTER, OF KREFELD-BOCKUM, GERMANY.

PROCESS FOR PRODUCING SODA CONTAINING WATER OF CRYSTALLIZATION OR MIXTURES THEREOF WITH OTHER SUBSTANCES.

No Drawing. Application filed July 9, 1920. Serial No. 395,076.

*To all whom it may concern:*

Be it known that I, Dr. ADOLF WELTER, citizen of the German Empire, residing at Krefeld-Bockum, Rhineland, Germany, have invented new and useful Improvements in Processes for Producing Soda Containing Water of Crystallization or Mixtures Thereof with Other Substances, of which the following is a specification.

My invention relates to processes for manufacturing hydrated sodium carbonate and mixtures of same with substances soluble in water, and it particularly relates to those processes by which a saturated aqueous solution of soda is sprayed into the air, the object of the invention being to render the process more expeditious and to produce the hydrated soda and other products at lower cost. My new invention consists in spraying water divided into as fine particles as possible unto commercial pulverized calcined soda $Na_2CO_3$ and in preventing same from lumping and caking by a suitable treatment and arrangement of the apparatus employed. If, instead of of pure water, solutions of alkali metal salts, preferably sodium salts, as for instance water-glass, Glauber's salt or soap are sprayed onto the soda, corresponding mixtures of soda and the particular substances used will be obtained. Of course, other salts than that of Glauber may also be added to the soda to be treated. It will be apparent from the above that the process employed may consist in blowing steam, or water divided into very fine particles, into a sort of tower, and in causing calcined soda, which has been finely sifted or reduced to fine powder, by compressed air to drop from above through the water vapor, while cold air is blown in from below. The air may be cooled expressly for this purpose. Under certain conditions snow may be advantageously used instead of water. According to the size of the tower as well as to the quantity of the air that is introduced from below for the purpose of cooling the soda the temperature of which tends to rise, and according to the time within which the various substances mentioned above react upon each other more or less non-caking refined soda containing water of crystallization is obtained at the bottom of the tower, which may be sold without further pulverization.

A modified process consists in transforming a jet of water into a fine spray by blowing it through a nozzle by means of compressed air, and in using the jet of water spray and air thus formed to blow calcined soda from a receptacle into a powder chamber. By this continuous process finely pulverized refined soda of pleasing appearance, and containing about 50–55% of anhydrous carbonate of soda is obtained.

In another modified process a thin layer of calcined soda is placed upon a long conveyor belt, or a worm or the like, and caused to brush past small resisting members that keep the soda continuously moving. By now spraying a thin aqueous solution of waterglass through suitable nozzles unto the conveyor belt, and by adjusting the speed of the travelling belt on the one hand and the spraying nozzle on the other, a continuously working process may be obtained by which a finely pulverized washing powder is produced which does not cake and which is also immediately marketable without further pulverization. The length of the conveyor belt or the like depends upon the quantity of water that is to be absorbed and this quantity is so adjusted that with the average humidity of the air a state of equilibrium is obtained, the gain or loss of weight in the finished product that is due to the varying humidity of the air is then not appreciable.

A further modified process consists in keeping pulverized calcined soda continuously moving in a suitable mixing vessel and in spraying an aqueous soap solution, which should be as finely divided as possible, unto the soda. The spray of the solution is regulated in such a manner as to prevent the soda from heating enough to cause caking or liquefaction. The quantity of the charge in the apparatus must therefore always be in a proper proportion to the cooling surface, and this proportion is affected very considerably by the temperature of the surrounding air.

It is a matter of course that any one of the processes hereinbefore described may be employed according to circumstances. The essential features of the invention are, that the calcined soda shall be divided into fine particles, that it shall be subject to the action of fine particles of water (liquid, vapor or snow), that suitable means (such as low temperature, or stirring, or both) shall be provided to prevent liquefaction or caking of the product, and finally that, if desired, any suitable substances may be added to the mixture thus produced whilst the described process is being carried out. The process is very simple and easy to employ and offers considerable technical and economical advantages over known processes for producing powdered crystal soda or mixtures thereof.

I claim:

1. A process for manufacturing hydrated sodium carbonate in the form of a fine crystalline powder, consisting in acting upon fine particles of anhydrous sodium carbonate with water in the form of a fine spray and keeping the sodium carbonate in motion during the reaction.

2. A process for manufacturing hydrated sodium carbonate in the form of a fine crystalline powder, consisting in acting upon fine particles of anhydrous sodium carbonate with water in the form of a fine spray and keeping the sodium carbonate at a low temperature during the reaction.

3. A process for manufacturing hydrated sodium carbonate in the form of a fine crystalline powder, consisting in acting upon fine particles of anhydrous sodium carbonate with water in the form of a fine spray and keeping the sodium carbonate at a low temperature and in motion during the reaction.

4. A process for manufacturing a fine crystalline powder of a mixture of sodium carbonate and an alkali metal salt, said process consisting in acting upon fine particles of anhydrous sodium carbonate with an aqueous solution of an alkali-metal salt sprayed upon the sodium carbonate, and blowing a current of air against the sodium carbonate while being thus treated.

5. A process for manufacturing a fine crystalline powder of a mixture of sodium carbonate and of soap, said process consisting in acting upon fine particles of anhydrous sodium carbonate with an aqueous solution of soap sprayed upon the sodium carbonate, and blowing a current of air against the sodium carbonate while being thus treated.

In testimony whereof I have signed my name to this specification in the presence of two subscribing witnesses.

Dr. ADOLF WELTER.

Witnesses:
KARL ALBERTS,
PETER MEUSERF.